United States Patent [19]

Proebsting

[11] 3,898,479

[45] Aug. 5, 1975

[54] LOW POWER, HIGH SPEED, HIGH OUTPUT VOLTAGE FET DELAY-INVERTER STAGE

[75] Inventor: Robert J. Proebsting, Richardson, Tex.

[73] Assignee: Mostek Corporation, Carrollton, Tex.

[22] Filed: Mar. 1, 1973

[21] Appl. No.: 337,132

[52] U.S. Cl. ............. 307/205; 307/221 C; 307/246; 307/269

[51] Int. Cl. ..................H03k 19/08; H03k 5/159; H03k 17/10

[58] Field of Search........ 307/205, 304, 221 C, 251, 307/279, 270, 208, 269, 246

[56] References Cited

UNITED STATES PATENTS

| | | | |
|---|---|---|---|
| 3,601,637 | 8/1971 | Spence | 307/251 X |
| 3,641,370 | 2/1972 | Heimbigner | 307/205 X |
| 3,649,843 | 3/1972 | Redwine et al. | 307/205 X |
| 3,660,684 | 5/1972 | Padgett | 307/279 |
| 3,735,277 | 5/1973 | Wanlass | 307/251 X |
| 3,746,913 | 7/1973 | Gianopulos | 307/221 C |
| 3,764,823 | 10/1973 | Donofrio et al. | 307/205 |
| 3,769,528 | 10/1973 | Chu et al. | 307/279 |
| 3,774,055 | 11/1973 | Bapat | 307/251 X |
| R27,305 | 3/1972 | Polkinghorn et al. | 307/279 X |

OTHER PUBLICATIONS

Lee et al., "Low–Power Dissipation FET Driver Circuit," IBM Tech. Discl. Bull., Vol. 14, No. 1, p. 1084, 9/1971.

Hsieh, "MOSFET Storage Array Addressing System," IBM Vol. 13, No. 8, Jan. 1971, pp. 2383–2384.

Linton, "MOSFET Read–Only Storage Cell," IBM Tech. Disclosure, Vol. 13, No. 7, Dec. 1970, p. 2017.

*Primary Examiner*—Michael J. Lynch
*Assistant Examiner*—L. N. Anagnos
*Attorney, Agent, or Firm*—Hubbard, Thurman, Turner & Tucker

[57] ABSTRACT

An integrated circuit and a method operating the circuit is disclosed wherein first and second MISFET transistors are connected with the source node of the first common with the drain node of the second and providing the output node of an inverter or delay stage. The output node is capacitively coupled back to the gate of the first transistor. A third transistor also connects the gate of the first transistor to a source of voltage, such as the drain voltage, in such a manner that the first transistor can be controlled and also such that a voltage higher than the drain voltage can be permitted on the gate of the first transistor. The first transistor is turned off and the second turned on to provide a logic "0" output, and conversely the first on and the seond off to provide a logic "1" output, with no power consumption in either state. To switch from a logic 0 output to a logic 1 output, the first transistor is switched on just prior to the time the second is being switched off so that as a result, the gate of the first transistor is "boot-strapped" to a voltage in excess of the drain voltage as a result of being capacitively coupled to the output node as the second transistor is switched off. The very high gate voltage results in very rapid switching of the first transistor to an output level equal to the drain voltage, yet results in excess power consumption only during the short switching cycle while both transistors are on. The same results can be achieved without using the second transistor if the gate node of the first transistor is switched on very rapidly. The circuit third transistor is switched on very rapidly. The circuit can be used as a delay stage for clock generators or as an inverter stage, depending upon the node selected as the data input.

9 Claims, 9 Drawing Figures

LOW POWER, HIGH SPEED, HIGH OUTPUT VOLTAGE FET DELAY-INVERTER STAGE

This invention relates generally to integrated circuits using field effect transistors (FET's) and more particularly relates to an inverter stage of the type typically used in integrated circuits which perform digital data processing.

Integrated circuits using field effect transistors, particularly of the metal-insulator-silicon type, commonly referred to as MISFET's, have been used extensively for the last several years for digital data processing. For example, complete hand held calculators have been fabricated on a single integrated circuit. These types of circuits have also been used extensively for date storage. In all of these applications, whether battery powered or otherwise, power consumption, switching speed and reliability resulting from widely spread logic levels are prime factors determining the commercial success of such circuits.

One of the more fundamental circuits used in digital data systems is a simple inverter stage typically comprised of a load device and a switching transistor connected in series between a drain supply voltage and a source voltage, with the gate of the switching transistor considered the data input and the drain node of the transistor, the data output. When the transistor is switched on by a voltage level near the drain supply voltage, a negative voltage, for p-channel transistors, and positive for n-channel transistors, usually considered a logic 1 level, the output node is pulled down to a voltage near the source voltage, typically ground, to produce a logic 0 level. In this state, current is continuously drawn through the load and the transistor, and substantial static power is consumed. No satisfactory answer to this problem has heretofore been devised without using both p channel and n channel transistors, a less economical approach.

Since diffused resistors suitable for the load in such an inverter occupy a prohibitive amount of space, it is common practice to employ another transistor as the load with the gate of the transistor connected to the drain supply voltage. This inverter stage suffers from the fact that the load transistor tends to switch off as the output goes toward the drain supply voltage, i.e., logic 1 level, because the gate to source voltage of the load transistor progressively decreases. Further, the logic 1 level is limited to one threshold less than the drain supply voltage. This combination of factors significantly increases the time required to switch to an acceptable logic 1 level.

The switching speed and output level can be improved by a so-called boot strap circuit wherein the gate of the load transistor is connected to the drain supply voltage by the channel of a third transistor and the gate of the load transistor is capacitively coupled to the output node. The gate of the third transistor is also connected to the drain supply voltage. When the output node is at a logic 0 level, the gate of the load transistor is one threshold below the drain supply voltage. Then as the input transistor is switched off, the output node is driven toward the drain supply voltage as a result of the capacitive coupling and the fact that the third transistor is switched off. As a result the load transistor is strongly turned on and the output node reaches the level of the drain supply voltage. However this type of circuit still consumes full static power while producing a logic 0 level at the output.

The present invention is concerned with an improved delay or inverter circuit which consumes no quiescent power, yet rapidly switches to the full drain supply voltage level to provide a highly reliable, high speed delay stage or inverter stage. This is achieved by providing a stage comprised of first and second transistors, the channels of which are connected in series between supply and source voltages, with the node which is the source of the first transistor and the drain of the second being one possible output node of the stage. This common node is capacitively coupled to the gate of the first transistor, which is an alternative output node. The gate of the first transistor is coupled by a third transistor to a voltage in such a manner as to first apply a voltage to the gate of the first transistor to turn the transistor on, then permit a voltage to remain on the gate that is greater than the drain supply voltage for the first transistor. The gate of the second transistor is controlled separately from the gate of the first. The two transistors are not on at the same time except for a brief overlap period when the output switches from near the source voltage to the supply voltage so that no static power is consumed.

When the output node is to be switched from a logic 0 level to a logic 1 level, the gate-to-source capacitance of the first transistor is first charged to begin to turn the first transistor on, before the second transistor is switched off. During this time the second transistor holds the common node near the source supply voltage. This charges the capacitor so that when the second transistor is switched off, the gate of the first transistor is boot-strapped to a voltage substantially above the drain voltage of the first transistor, thus switching the first transistor hard on to rapidly drive the common node all the way to the drain voltage.

In accordance with another aspect of the invention, only the first and third transistors are turned on to cause the output to be switched all the way to the drain supply voltage, a logic 1 level at a high rate. The second transistor is turned on only when the output is to be discharged to a logic 0 level. This is practical when the source node of the first transistor is connected to drive a relatively large capacitance and the third transistor is turned on very rapidly. The invention also contemplates several specific circuits for controlling the switching sequence of the first and second transistors and for specific applications of the circuit. The circuit of this invention is highly useful as a delay stage or as an inverter stage in an integrated circuit.

The novel features believed characteristic of this invention are set forth in the appended claims. This invention itself, however, as well as other objects and advantages thereof, may best be understood by reference to the following detailed description of illustrated embodiments, read in conjunction with the accompanying drawings:

Figure 1:
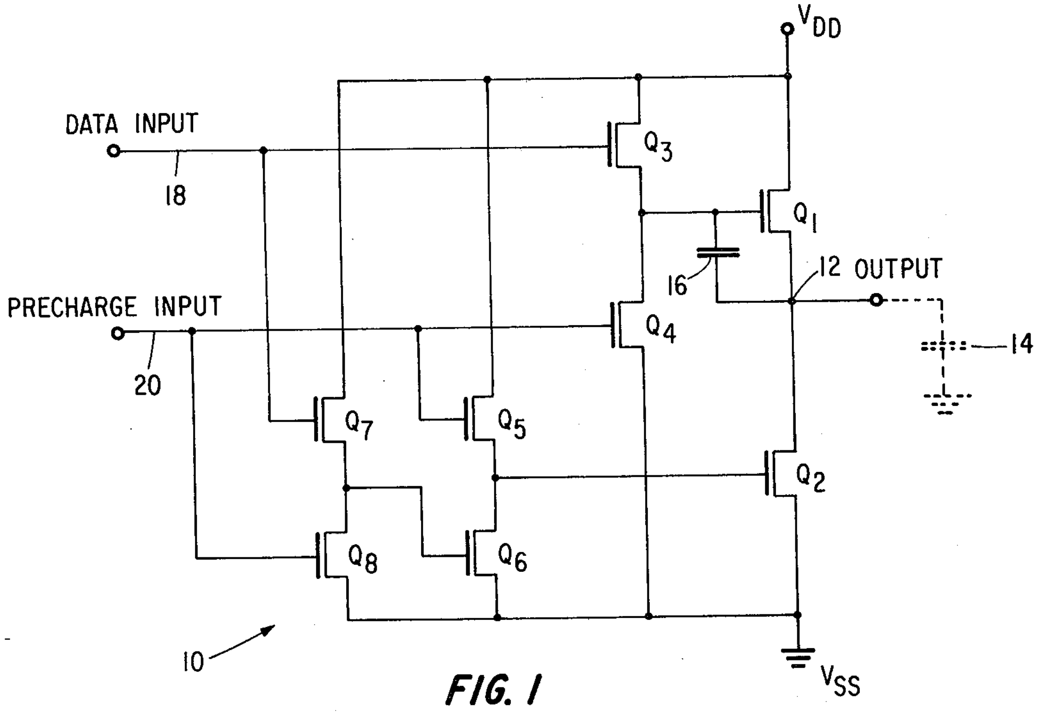
FIG. 1 is a schematic circuit diagram of a delay circuit in accordance with present invention.

Referring now to the drawings, and in particular to FIG. 1, a circuit in accordance with the present invention is indicated generally by the reference numeral 10. The circuit 10 has an inverter stage comprised of transistors $Q_1$ and $Q_2$. The drain node of transistor $Q_1$ is connected to a drain voltage supply $V_{DD}$. The source node of transistor $Q_1$ and drain of transistor $Q_2$ are common and provide an output node 12 which is typically connected to drive some capacitive load 14 in an integrated circuit. The source node of transistor $Q_2$ is connected to a source supply voltage $V_{SS}$. The common drain and source node 12 may be considered the output of the inverter stage and is capacitively coupled to the gate of transistor $Q_1$ by a capacitor 16.

The circuit 10 is controlled by a voltage signal applied to a data input 18. In addition, a voltage signal is applied to a precharge input 20. The precharge signal is essentially the complement of the voltage applied to the data input 18. For purposes of this discussion, a voltage level near the drain voltage supply $V_{DD}$ will be considered a logic 1 level, while a voltage level near the source voltage supply $V_{SS}$ will be considered a logic 0 level.

Three push-pull inverter stages comprised of transistors $Q_3$ and $Q_4$, $Q_5$ and $Q_6$, and $Q_7$ and $Q_8$ are connected between the drain voltage $V_{DD}$ and source voltage $V_{SS}$. The data input voltage is applied to the gates of transistors $Q_3$ and $Q_7$ so that those stages are operated in the source follower node. The voltage on the precharge input 20 is applied to the gates of transistors $Q_4$, $Q_5$ and $Q_8$. The output of the push-pull inverter comprised of transistors $Q_7$ and $Q_8$ is connected to the gate of transistor $Q_6$, and the output of the push-pull inverter comprised of transistors $Q_5$ and $Q_6$ is connected to the gate of transistor $Q_2$.

In the operation of the circuit 10, assume that the data input 18 is is at a logic 0 level, so that the transistors $Q_3$ and $Q_7$ would be turned off. In that case, the precharge input 20 would be at a logic 1 level and transistors $Q_4$, $Q_5$ and $Q_8$ would all be turned on. Since transistor $Q_7$ is off, and transistor $Q_8$ is on, transistor $Q_6$ would be turned off. Since transistor $Q_5$ is on and transistor $Q_6$ off, transistor $Q_2$ would be turned on. Since transistor $Q_3$ is off, and transistor $Q_4$ on, transistor $Q_1$ is off. Since transistor $Q_1$ is off and transistor $Q_2$ on, the data output is at a logic 0 level.

Now assume that the precharge input goes to a logic 0 level and that the data input 18 transistions from a logic 0 level to a logic 1 level. As transistor $Q_3$ is switched on and transistor $Q_4$ is switched off, the gate of transistor $Q_1$ moves toward $V_{DD}$, approximately one threshold behind the data input voltage. Because of the delay produced by the stages formed by transistors $Q_7$ and $Q_8$, and transistors $Q_5$ and $Q_6$, transistor $Q_2$ remains on, and holds the output node 12 to a voltage near $V_{SS}$ so that capacitor 16 is charged to a potential substantially greater than one threshold as would normally be the case. Transistor $Q_7$ is turned on and transistor $Q_8$ is turned off substantially in synchronism with transistors $Q_3$ and $Q_4$. However, transistor $Q_6$ is turned on one threshold behind the data input voltage. As transistor $Q_6$ turns on, the gate of transistor $Q_2$ is pulled toward $V_{SS}$ and transistor $Q_2$ is turned off at a point in time after the capacitor 16 has been charged to a voltage approaching $V_{DD}$ less one threshold. Then as out the output node 12 is driven toward $V_{DD}$ after transistor $Q_2$ turns off, the gate of transistor $Q_1$ is driven even beyond $V_{DD}$ as a result of the charge on capacitor 16 which was established during the delay produced by the two stages controlling the gate of transistor $Q_2$. As the gate of transistor $Q_1$ exceeds the data input voltage less one threshold, transistor $Q_3$ turns off, allowing the gate of transistor $Q_1$ to go beyond $V_{DD}$. The high gate to source voltage of transistor $Q_1$ causes $Q_1$ to turn on very rapidly and voltage on the output node 12 goes all the way to $V_{DD}$ because the voltage on the gate can exceed the drain supply voltage $V_{DD}$ by substantially more than one threshold. Since transistor $Q_2$ is now switched off, no power is consumed in the static state and the output node 12 is at $V_{DD}$.

Figure 2:
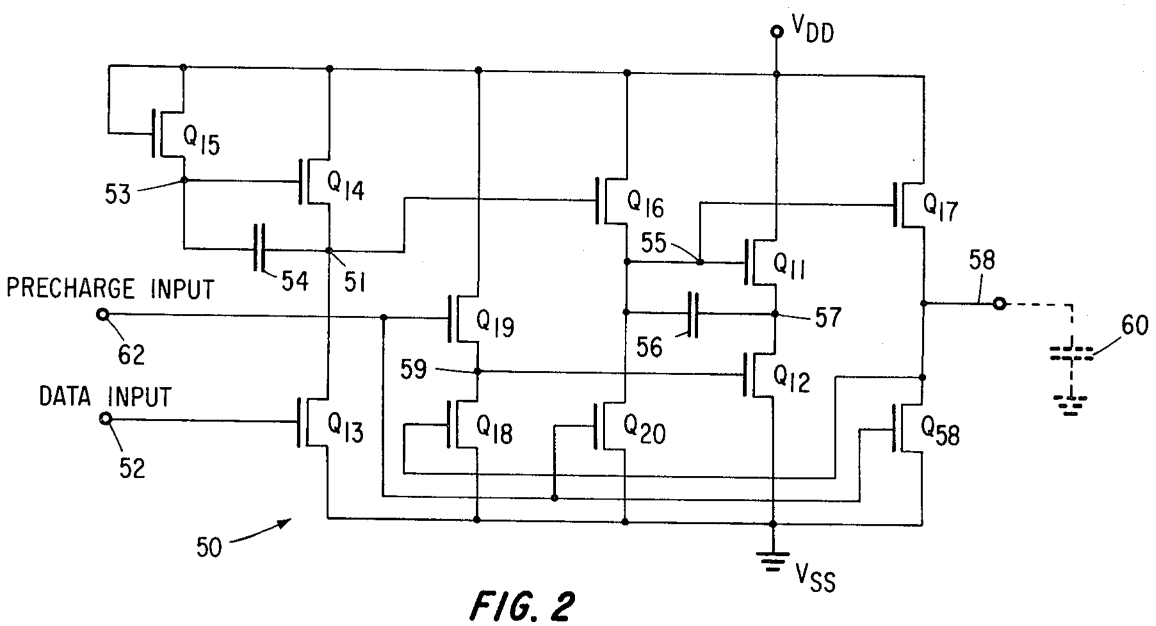
FIG. 2 is a schematic circuit diagram of another embodiment of a delay circuit in accordance with the present invention.

The output node 12 can be switched at the highest rate by allowing the gate of transistor $Q_1$ to go all the way to $V_{DD}$ less one threshold before $Q_2$ is switched off so that the gate will rise to the maximum possible voltage as transistor $Q_2$ is switched off. However where it is desirable to conserve power at the expense of maximum switching speed, it is desirable to begin to switch transistor $Q_2$ off before the gate of transistor $Q_1$ has reached the maximum level as the result of the charge through transistor $Q_3$. The output node 12 can still be made to switch all the way to $V_{DD}$ in a reasonable period of time without consuming as much power. The timing between the switching of transistors $Q_3$ and $Q_2$ can be accurately controlled by the design of the control transistors $Q_5$, $Q_6$, $Q_7$ and $Q_8$. Referring now to FIG. 2, another circuit in accordance with the present invention is indicated generally by the referenced numeral 50. Circuit 50 includes transistors $Q_{11}$ and $Q_{12}$ which function in the same manner as transistors $Q_1$ and $Q_2$ of circuit 10. A data input terminal 52 is connected to transistor $q_{13}$ of a conventional boot-strap inverter which includes transistors $Q_{14}$ and $Q_{15}$. Node 51, which is the source of transistor $Q_{14}$ and drain of transistor $Q_{13}$ is coupled by capacitor 54 to node 53. The gate and drain of transistor $Q_{15}$ are connected to the drain voltage supply $V_{DD}$, and the source is connected to node 53 and thus to the gate of transistor $Q_{14}$. Node 51 of the boot-strap inverter controls the gate of transistor $q_{16}$ which in turn controls node 55 and thus the gate of transistor $Q_{11}$. Node 55 is also coupled to node 57, which is the source of transistor $Q_{11}$ and the drain of transistor $Q_{12}$, by a capacitor 56. Node 55 is used as the output of the inverter stage comprised of transistors $Q_{19}$ and $q_{20}$ and is connected to the gate of transistor $Q_{17}$. Transistor $Q_{17}$ drives the output node 58, which is typically coupled to some capacitance load 60. Node 58 is also connected back to the gate of transistor $Q_{18}$ to turn transistor $Q_{12}$ off after transistor $Q_{16}$ has been turned on long enough to sufficiently charge capacitor 56.

Transistor $Q_{19}$, $Q_{20}$ and $Q_{58}$ are controlled by a voltage applied to a precharge input 62 to precharge node 59 to a logic 1 level and discharge nodes 56 and 58 to logic 0 levels. The voltage signal applied to precharge input 62 has only the constraint that it is never in a logic 1 level when the data input is in a logic 0 level. It must previously have been at a logic 1 level for at least some period of time to turn transistor $Q_{19}$ on and thereby charge node 59 during the period of time the data input 52 is at a logic 1 level.

In the operation of the circuit 50, assume first that the input 52 is at a logic 1 level so that transistor $Q_{13}$ is turned on, thereby holding node 51 near $V_{SS}$. Assume also that the precharge input 62 has just been to the logic 1 level so that transistor $Q_{19}$ was turned on and node 59 charged to a voltage near $V_{DD}$ to turn transistor $Q_{12}$ on and thus pull node 57 down to a voltage near $V_{SS}$. Since data input 52 is at the logic 1 level, transistor $Q_{13}$ is turned on and node 51 is held at a voltage near $V_{SS}$, even though load transistor $Q_{14}$ is conducting. Since node 51 is near $V_{SS}$, transistor $Q_{16}$ is turned off and node 55 will be near $V_{SS}$ as a result of earlier conduction through transistor $Q_{20}$ and therefore transistors $Q_{11}$ and $Q_{17}$ will be turned off. The output node 58 will also be near $V_{SS}$ as a result of earlier conduction through transistor $Q_{58}$ so that transistor $q_{18}$ is turned off to permit node 59 to remain at a high level near $V_{DD}$ and keep transistor $Q_{12}$ on.

Figure 2A:
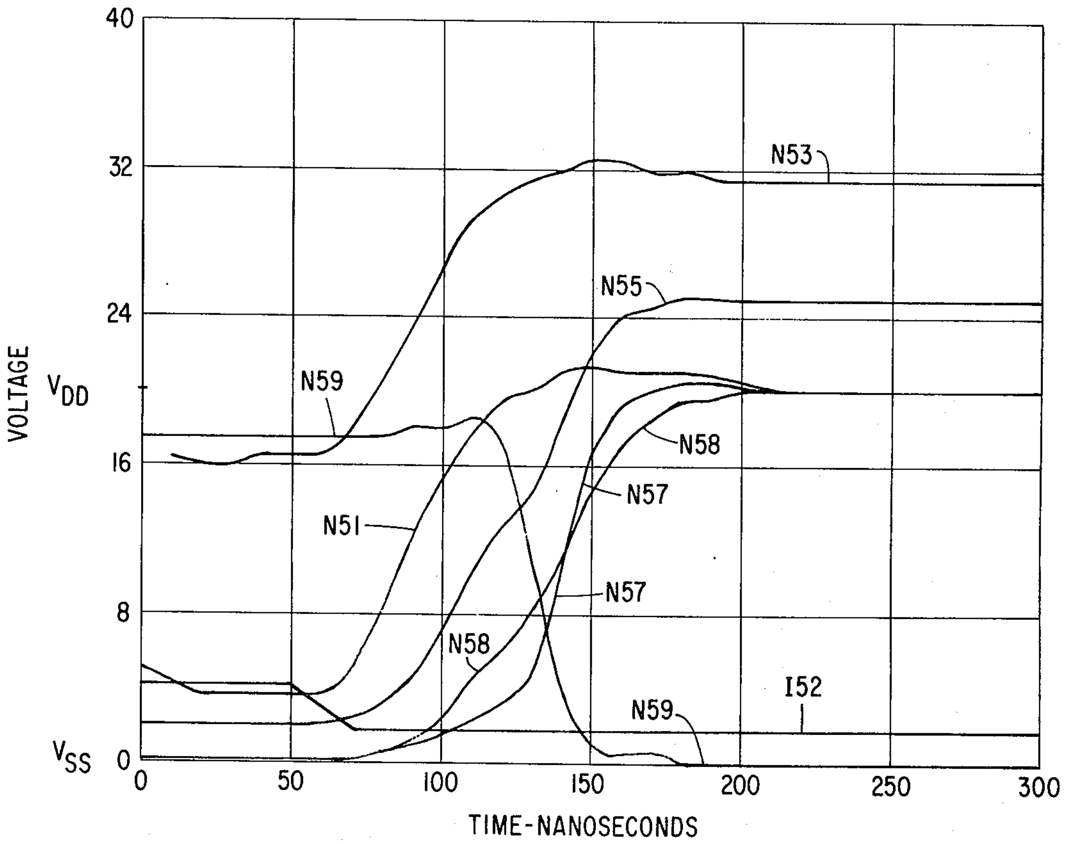
FIG. 2A illustrates the voltage levels at selected nodes within the circuit of FIG. 2 as the output is switched from a logic 0 level to a logic 1 level.

Assume now that the data input 52 transitions from a logic 1 level to a logic 0 level at some time after the precharge input 62 has returned to a logic 0 level from a logic 1 level which established node 59 at a voltage sufficiently high to hold transistor $Q_{12}$ on. This transition is illustrated in FIG. 2A where the voltage at the various nodes are plotted with repsect to time. The voltage at the respective nodes are indicated by the same referenced numeral as in FIG. 2, preceded by the character "N". For example, the voltage on node 51 in FIG. 2 is illustrated by curve N51 in FIG. 2A. The input is indicated by I52. The time scale is in nanoseconds and the voltage scale in volts, with $V_{DD}$ equal 20 volts. The data input voltage is between approximately 1 volt and 2.5 volts, the levels normally received from a TTL logic circuit. The precharge input may be generated internally on the chip and has a full supply voltage swing.

Node 53 is normally held at $V_{DD}$ less one threshold. Then as transistor $Q_{13}$ is switched off by the data input going to logic 0 level, at about 50 nanoseconds in FIG. 2, node 51 is driven toward $V_{DD}$ by current through load transistor $Q_{14}$. Because of the charge on capacitor 54 node 53 is driven higher to a voltage considerably greater than $V_{DD}$ which keeps transistor $Q_{14}$ hard on and drives node 51 rapidly all the way to $V_{DD}$. The voltage on node 51 switches transistor $Q_{16}$ on so that node 55 follows about one threshold behind node 51. As node 55 is driven toward $V_{DD}$, transistors $Q_{11}$ and $Q_{17}$ begin to conduct so that node 58 begins to follow approximately one threshold behind node 55, while transistor $Q_{12}$ retards the voltage rise on node 57 to precharge capacitor 56 to a higher voltage. As node 58 is driven toward the drain voltage $V_{DD}$, transistor $Q_{18}$ is turned on, pulling node 59 toward $V_{SS}$, thus turning transistor $Q_{12}$ off. When node 59 is about one threshold above $V_{SS}$ so that transistor $Q_{12}$ turns off, node 57 rises very rapidly toward $V_{DD}$. Because of the coupling provided by the capacitor 56, node 55 is then driven higher than $V_{DD}$ which keeps transistor $Q_{11}$ hard on as node 57 is rapidly driven all the way to $V_{DD}$. This also drives node 55 higher, and the high voltage on node 55 drives transistor $Q_{17}$ hard on. Transistors $Q_{11}$, $Q_{17}$, and $Q_{18}$ are thus all on at the end of the switching cycle.

Circuit 50 is capable of driving a large capacitive load at relatively high speeds all the way to $V_{DD}$ with minimum power consumption. It will be noted that a logic 0 level on the output 58 is provided when transistor $Q_{17}$ is off and transistor $Q_{58}$ is on and a logic 1 level is provided when transistor $q_{17}$ is on and transistor $Q_{58}$ is off so that there is no power dissipation in the quiescent state whether a logic 0 or a logic 1 is being provided at the output. As previously discussed transistors $Q_{11}$ and $Q_{12}$ are on at the same time only during the brief switching interval illustrated in FIG. 2A. In addition, transistors $Q_{17}$ can be made large relative to transistors $Q_{11}$ and $Q_{12}$ to minimize this power consumption. Transistors $Q_{18}$ and $Q_{19}$ are never on at the same time nor are transistors $Q_{16}$ and $q_{20}$ so that no power is consumed in the quiescent state. The input stage comprised of transistors $Q_{13}$ and $Q_{14}$ does consume power whenever transistor $Q_{13}$ is turned on because transistor $Q_{14}$ conducts. However these transistors can be made very small to minimize the power consumption. It is significant to note that the output transistor $Q_{17}$ is driven by node 55, rather than node 57. The voltage on node 55 in excess of of drain voltage $V_{DD}$ can very rapidly switch a relatively large output transistor $Q_{17}$ to drive the output node 58 all the way to $V_{DD}$.

Figure 3:
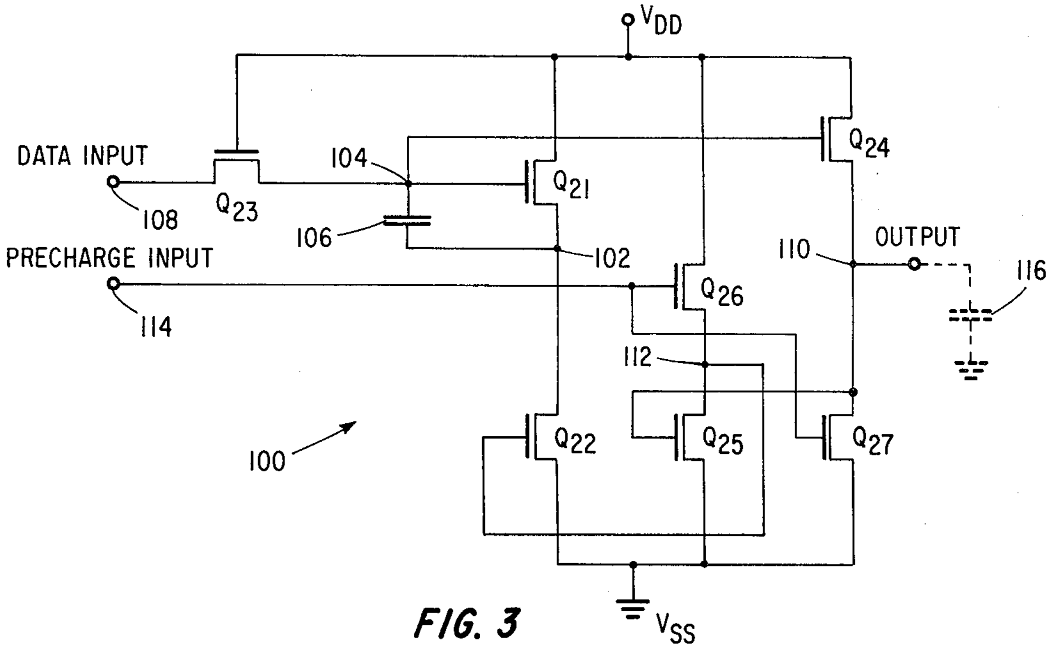
FIG. 3 is a schematic circuit diagram of still another embodiment of a delay circuit in accordance with the present invention; and, FIG. 3A illustrates the voltage levels at selected nodes within the circuit of FIG. 3 as the output is switched from a logic 0 level to a logic 1 level.

Another circuit in accordance with the present invention is indicated generally by the reference numeral 100 in FIG. 3. The circuit 100 is comprised of transistors $Q_{21}$ and $Q_{22}$ which are connected in series between a drain supply voltage $V_{DD}$ and a source supply voltage $V_{SS}$. The source of transistor $Q_{21}$ and drain of transistor $Q_{22}$ are a common node 102 which is capacitively coupled to node 104 by capacitor 106. Node 104 is connected to the gate of transistor $Q_{21}$ and to the gate of transistor $Q_{24}$. A data input voltage is applied to terminal 108 which is connected by transistor $Q_{23}$ to node 104. The gate of transistor $Q_{23}$ is connected to the drain voltage supply $V_{DD}$. Transistor $Q_{24}$ connects $V_{DD}$ to output node 110, which may be connected to drive a relatively high capacitive load 116. Node 110 is also connected back to the gate of transistor $Q_{25}$ of a delay stage which includes a precharge transistor $Q_{26}$. The source and drain of transistors $q_{26}$ and $Q_{25}$, respectively, provide a common node 112 which is connected to the gate of transistor $Q_{22}$. A precharge terminal 114 controls the gates of transistors $Q_{26}$ and $Q_{27}$. The channel of transistor $Q_{27}$ connects the output node 110 to the source supply voltage $V_{SS}$ to establish the logic 0 level at the output. The voltage applied to the precharge terminal 114 may be merely the complement of the voltage applied to input 108, or may be any other voltage which turns transistor $Q_{26}$ on to charge node 112 sufficiently toward $V_{DD}$ to hold transistor $Q_{22}$ on prior to a logic 0 to logic 1 transition at input terminal 108.

Figure 3A:
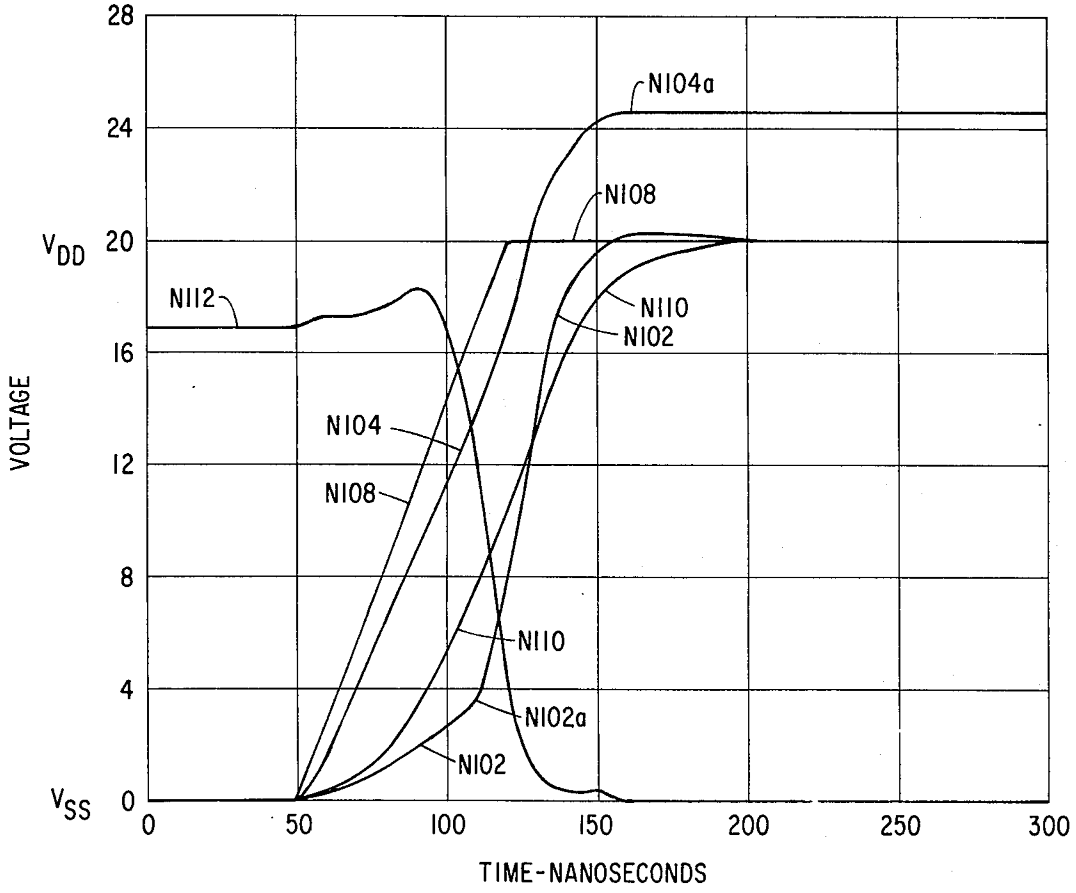

The operation of the circuit 100 can best be understood by referring to FIG. 3A. Assume, first that the input node 108 is at a logic 0 level, which will be considered that nearest $V_{SS}$, and that the precharge input 114 has just been cycled to a logic 1 level in order to turn transistor $Q_{26}$ on and thus charge node 112 toward the drain supply voltage to insure that transistor $Q_{22}$ is turned on. Since input 108 is at a logic 0 level, transistors $Q_{21}$ and $Q_{24}$ will be turned off and nodes 102 and 110 will be held near $V_{SS}$. Since node 110 will be at a logic 0 level transistor $Q_{25}$ will be off, permitting node 112 to remain at the precharge level near $V_{DD}$. These states are represented in FIG. 3A between 0 and 50 nanoseconds. Then input 108 goes to a logic 1 level, which is the supply voltage $V_{DD}$ of 20 volts as illustrated by line N108 at 50 nanoseconds in FIG. 3A. Transistor $Q_{23}$ is conducting so that node 104 begins to charge immediately to a logic 1 level. As node 104 rises to a logic 1 level, transistor $Q_{24}$ is turned on so that the output node 110 begins to rise approximately one theshold behind node 104. As soon as transistor $Q_{25}$ turns on node 112 is pulled down toward $V_{SS}$ to begin to turn transistor $Q_{22}$ off. When transistor $Q_{22}$ is turned off, node 102 begins to rise very rapidly as indicated at N102*a*. This drives node 104 to a higher level than $V_{DD}$ as indicated at N104*a* in FIG. 3A, thus keeping both transistors $Q_{21}$ and $Q_{24}$ on hard to drive nodes 102 and 110 at a high rate all the way to $V_{DD}$.

Thus it will be noted that the output node 110 essentially tracks the input node 108, but after a predetermined interval of time, which in the present case is approximately thirty nanoseconds. Thus a plurality of the delay circuits 100 can be connected in series to generate a series of rising edges internally of an integrated circuit suitable for use as the clock phases of a dynamically operated circuit. The circuit 100 is also useful as a buffer to reduce the capacitive load on an input clock pulse to an integrated circuit. This is possible because the input drives only the gates of transistor $Q_{21}$ and $Q_{24}$ while the large circuit capacitance is driven by transistor $Q_{24}$.

The circuit 100 is particularly useful for generating a logic 0 to a logic 1 transition at the output 110 in response to a logic 0 transition on input 108. Thus a series of the circuits 100 is highly suitable for producing a series of logic 0 to Logic 1 transistions each rapidly going all the way to $V_{DD}$ which are often required to operate a digital circuit on a single integrated circuit chip.

Figure 4:
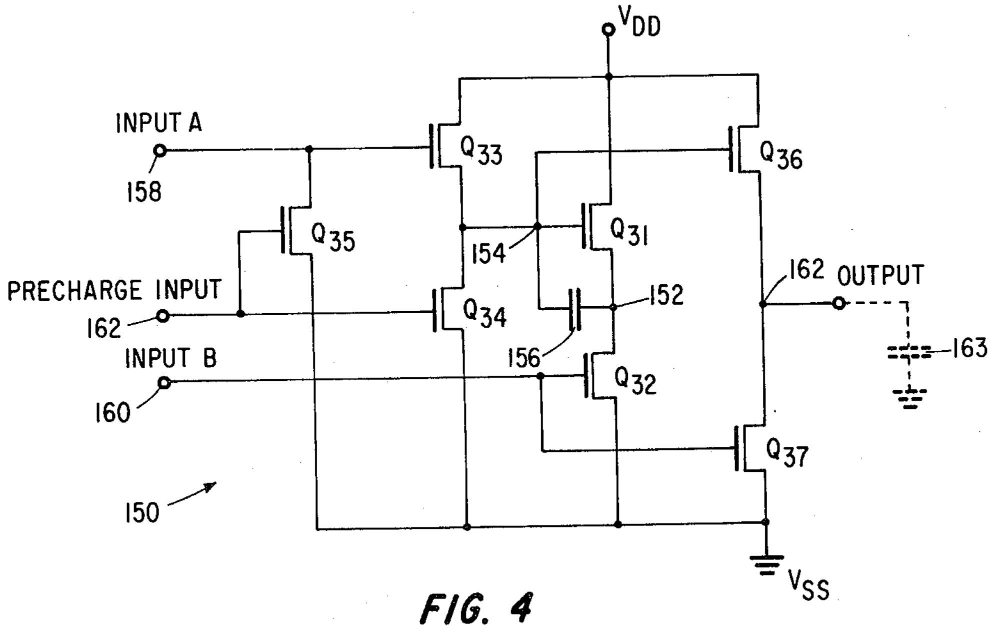
FIG. 4 is a schematic circuit diagram of yet another embodiment of the present invention.

Still another circuit in accordance with the invention is indicated generally by the reference numeral 150 in FIG. 4. The circuit 150 includes transistors $Q_{31}$ and $Q_{32}$ which are connected in series between the drain voltage $V_{DD}$ and a source voltage $V_{SS}$ with node 152 being the source and drain of transistors $Q_{31}$ and $Q_{32}$ respectively. The node 152 is coupled to node 154 by capacitor 156. Node 154 is connected by the channel of transistor $Q_{33}$ to the drain voltage $V_{DD}$, and by transistor $Q_{34}$ to the source voltage $V_{SS}$. The gate of transistor $Q_{33}$ is connected to Input A terminal 158. The gate of transistor $Q_{32}$ is connected to Input B terminal 160. Input A and Input B are characterized in that Input B transitions from a logic 1 level to a logic 0 level a short time after Input A transitions from a logic 0 level to a logic 1 level. Transistors $Q_{34}$ and $Q_{35}$ are provided to preset node 154 and node 158 at a logic 0 level in response to a logic 1 level on precharge input 162 prior to the transistion of Input A from a logic 0 level to a logic 1 level. A pair of output transistors $Q_{36}$ and $Q_{37}$ are connected in series between $V_{DD}$ and $V_{SS}$ with the source of transistor $Q_{36}$ and the drain of transistor $Q_{37}$ common and forming an output node 162. The gate of transistor $Q_{36}$ is controlled by node 154, and the gate of transistor $Q_{37}$ is controlled by the Input B terminal 160.

Assume now than inputs 158 and 160 are at logic 0 and logic 1 levels respectively. Assume also that the precharge 162 has been raised to a logic 1 level so as to turn transistors $Q_{34}$ and $Q_{35}$ on and pull nodes 154 and 158 to $V_{SS}$, and then has been returned to a logic 0 level to turn transistors $Q_{34}$ and $Q_{35}$ off. Then when Input A is raised to a logic 1 level, transistor $Q_{33}$ is turned on to begin charging node 154 toward $V_{DD}$. After node 154 has been charged toward $V_{DD}$ to at least an amount greater than one threshold, preferably significantly more than one threshold, Input B transitions to a logic 0 level to turn transistors $Q_{32}$ and $Q_{37}$ off. As transistor $Q_{32}$ turns off, the voltage on node 152 begins to rise as a result of current through transistor $Q_{31}$. The rising voltage on node 152 is coupled by capacitor 156 to node 154 which continues to rise even beyond $V_{DD}$ keeping transistors $Q_{31}$ and $Q_{36}$ on hard as node 162 is driven rapidly toward $V_{DD}$. When the voltage on node 154 exceeds the voltage on Input A minus one threshold, transistor $Q_{33}$ turns off so that the voltage on node 154 can exceed $V_{DD}$ by the voltage just stored on capacitor 156 as node 152 begins to move toward $V_{DD}$ as transistor $Q_{32}$ turns off. As a result of the high voltage on node 154, and thus on the gates of transistors $Q_{31}$ and $Q_{36}$, these transistors remain on hard to rapidly drive node 162 all the way to $V_{DD}$. The circuit 150 thus provides a push-pull output circuit capable of rapidly driving a large capacitive load all the way to $V_{DD}$ with relatively low input power and with no quiescent power consumption.

Figure 5:
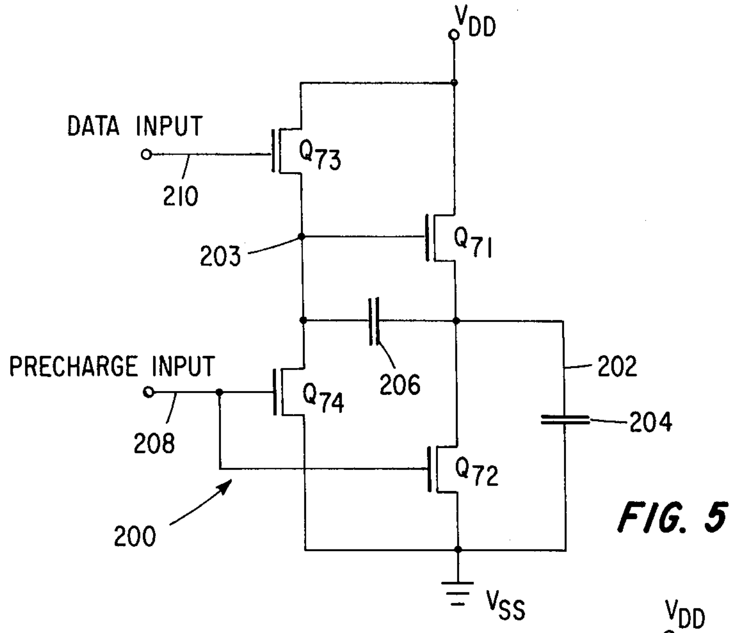
FIG. 5 is a schematic circuit diagram of still another circuit in accordance with the present invention.

Referring now to FIG. 5, another circuit in accordance with the present invention is indicated generally by the reference numeral 200. The circuit 200 is comprised of transistors $Q_{71}$ and $Q_{72}$ the channels of which are connected in series between the drain supply voltage $V_{DD}$ and the source supply voltage $V_{SS}$, which is typically ground. The source node of transistor $Q_{71}$ is common with the drain node of transistor $Q_{72}$ and may be considered as an output 202 which is coupled to a relatively large capacitance 204, which is typically one or more gate nodes of transistors in circuitry on an integrated circuit chip. The output node 202 is coupled to node 203 by a capacitor 206 which is typically considerably smaller than the capacitor 204. The channel of transistor $Q_{73}$ connects node 203 to the drain supply voltage $V_{DD}$. Node 203 is also connected to the gate of transistor $Q_{71}$. The channel of transistor $Q_{74}$ connects node 203 to the source supply voltage $V_{SS}$. The gates of transistors $Q_{72}$ and $Q_{74}$ are connected to a precharge input node 208. The gate of transistor $Q_{73}$ is the data input node 210. The input node 210 may be connected to any data input having a transition from $V_{SS}$ toward $V_{DD}$ which which occurs at a high rate such as, for example, node 102 in the circuit 100. The precharge input 208 may be the same signal applied at the precharge inputs of the circuits heretofore described, and is characterized in that it is always at a logic 0, when the data input 210 is at a logic 1 level.

In the operation of the circuit 200, a logic 0 is produced at the output 202 by bringing the precharge input node 208 to a logic 1 level to turn transitors $Q_{72}$ and $Q_{74}$ on. This pulls nodes 202 and 203 down to $V_{SS}$ because data input node 210 is a logic 0 level and transistor $Q_{73}$ is off. Node 203 is at $V_{SS}$ which turns transistor $Q_{71}$ off, thus allowing node 202 to be at $V_{SS}$. Before input node 210 transitions from a logic 0 level to a logic 1 level, precharge input node 208 goes toward a logic 0 level so that transistors $Q_{72}$ and $Q_{74}$ are turned off. Then a very rapidly rising transistion from a logic 0 level to a logic 1 level on data input node 210 switches transistor $Q_{73}$ on and charges node 203 rapidly toward $V_{DD}$. The current charging node 203 to $V_{DD}$ is also applied to node 202 and thus to capacitor 204 since transistor $Q_{72}$ is off. However, because of the relative size of capacitors 206 and 204 and the speed at which node 203 is charge to $V_{DD}$, a voltage substantially in excess of the threshold voltage is established across capacitor 206 before transistor $Q_{71}$ conducts sufficiently to charge the large capacitance 204 to raise node 202 significantly. Thus node 202 lags behind node 203 as both nodes rise toward $V_{DD}$ so that a high gate-to-source voltage of transistor $Q_{71}$ is established. This voltage remains relatively high even as the output node approaches $V_{DD}$, so that transistor $Q_{71}$ remains on hard as node 202 is pulled up to $V_{DD}$. Thus the circuit 200 can be used as a simplified delay stage when the criteria of a rapid transition on data input node 210 and a relatively large load capacitor 204 are met. The result is that node 202 very rapidly transitions from ground all the way to $V_{DD}$ a predetermined short time after the data input voltage makes a similar transition.

Figure 6:
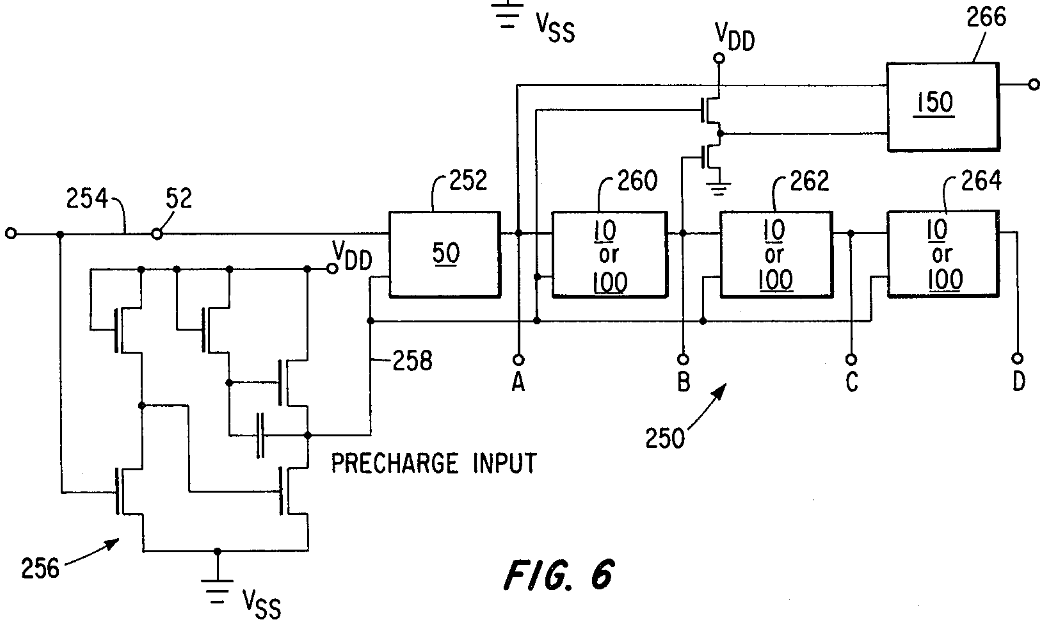
FIG. 6 is a schematic block diagram illustrating how the circuits of the present invention may be utilized in an on-chip multiple clock generator in accordance with another aspect of this invention.

As previously mentioned, the delay circuits of the present invention are particularly suited for generating a series of clock pulses which can be used to operate a digital dynamic data system incorporated on a single integrated circuit chip. Such a circuit is illustrated by the reference numeral 250 in FIG. 6. For example, the circuit 50 could be provided as a first stage 252. A data input 254 would be connected to the data input node 52. The data input could also be applied to a conventional double inverter stage 256 to produce a precharge input node 258. A precharge input 258 would then be connected to the precharge input of stage 252. Additional stages 260, 262 and 264 may be cascaded in series behind stage 252. The stages 260, 262 and 264 may typically be either circuits 10 or circuits 100 heretofore described. In each case, the data output of the respective stage is coupled to the data input of the next following stage. The output 258 of the precharge stage would be connected to the respective precharge inputs of all the cascaded stages.

Figure 7:
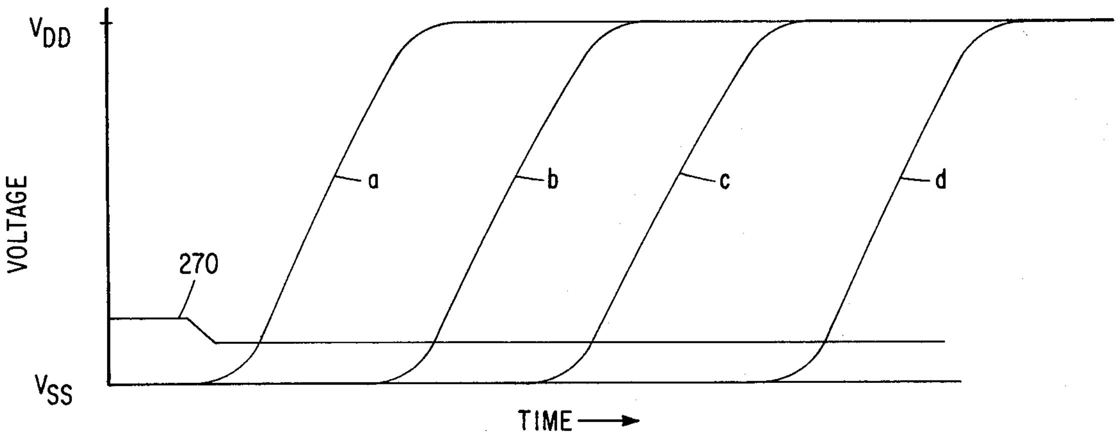
FIG. 7 is a simplified plot illustrating the operation of the circuit of FIG. 6

The data outputs of the respective stages can be picked off at outputs A, B, C and D. These outputs are illustrated in FIG. 7 by curves *a*, *b*, *c*and *d*, respectively. In FIG. 7 the input data signal applied to input 254 is indicated by the reference numeral 270.

In addition, a circuit 150 may use output A and an inverted output B as Input A and Input B, respectively, illustrated in FIG. 4. A circuit 150 is indicated at 266 in FIG. 6. If desired, a plurality of the circuits 150 can be cascaded by using the outputs of any two preceding stages having the appropriate timing. Or the circuits 10, 50, 100, 150 or 200 may be intermixed in substantially any desired sequence in order to provide a series of output signals having the desired rise time, drive capability and arranged in the desired sequence to carry out the functions of a complex digital circuit. All of this can be achieved internally on an integrated circuit chip in response to a single TTL logic level input voltage 270 to the chip.

Although preferred embodiments of the invention have been described in detail it is to be understood that various changes, substitutions and alterations can be made in these embodiments without departing from the spirit and scope of the invention as defined by the appended claims.

What is claimed is:

1. A circuit comprising a plurality of transistors havng source, gate and drain nodes, the drain node of a first transistor being connectable to a drain supply voltage, the source node of the first transistor and the drain node of a second transistor being electrically common, the source node of the second transistor being connectable to a source voltage, the gate node of the first transistor being capacitively coupled to the source node of the first transistor by a capacitance, and control circuit means for sequentially causing, in response to each of a sequence of timing signals, the gate of the first transistor to transition from a voltage near the source voltage toward the drain voltage to turn the first transistor on and then causing the gate of the second transistor to transition from a voltage near the drain voltage to a voltage near the source voltage to turn the second transistor off thus causing the voltage on the gate node of the first transistor to exceed the drain voltage as a result of the capacitive coupling from the source node of the first transistor to the gate node of the first transistor, the control circuit means including a first stage comprised of third and fourth transistors having an output connected to the gate of the first transistor, second and third stages connected in cascade to control the gate of the second transistor, and a data input node connected to the inputs of the first and second stages such that the delay produced by the second and third stages will be greater than the delay by the first stage to cause the second transistor to be switched off a short time interval after the first transistor is switched on.

2. A circuit comprising a plurality of delay stages connected in cascade each delay stage comprising a pluraity of transistors which have source, gate and drain nodes, the drain node of a first transistor being connectable to a drain supply voltage, the source node of the first transistor and the drain node of a second transistor being electrically common, the source node of the second transistor being connectable to a source voltage, the gate node of the first transistor being capacitively coupled to the source node of the first transistor by a capacitance, and control circuit means having an input node for sequentially causing, in response to an input signal on the input node, the gate of the first transistor to transition from a voltage near the source voltage toward the drain voltage to turn the first transistor on and then causing the gate of the second transistor to transition from a voltage near the drain voltage to a voltage near the source voltage to turn the second transistor off thus causing the voltage on the gate node of the first transistor to exceed the drain voltage as a result of the capacitive coupling from the source node of the first transistor to the gate node of the first transistor to thereby cause the source node of the first transistor to substantially reach the drain voltage, the input node of each succeeding stage being connected to a node of the preceding stage which produces said input signal in predetermined time relationship to the transition of the gate and source node of the first transistor from near the source voltage supply toward the drain voltage supply.

3. The circuit of claim 2 wherein the node that is the common source and drain voltage for the first and second transistors is the output for the stage.

4. The circuit of claim 2 wherein the circuit means includes a third transistor for selectively connecting the gate of the first transistor to a voltage supply to turn the first transistor on, the third transistor being connected such as to automatically turn off when the voltage on the gate of the first transistor exceeds the drain voltage of the first transistor.

5. The circuit of claim 4 wherein a single input voltage controls the third transistor and further comprising circuit means responsive to the single input voltage for inverting and delaying transitions of the input voltage signal from near the source voltage to near the drain voltage to provide a second voltage signal for controlling the second transistor.

6. The circuit of claim 4 wherein the third transistor connects the gate of the first transistor to the drain supply voltage and an input voltage is applied to the gate of the third transistor.

7. The circuit of claim 4 further comprising precharge means for establishing the gate of the first transistor at a voltage approaching the source supply voltage and the gate of the second transistor to a voltage sufficient to turn the transistor on prior to a transition of a data output from near the source voltage to near the drain voltage.

8. A circuit comprising a plurality of sequential stages each having first and second transistors, the drain node of the first transistor being connectable to a drain supply voltage, the source node of the first transistor and the drain node of the second transistor being electrically common, the source node of the second transistor being connectable to a source voltage, the gate node of the first transistor being capacitively coupled to the source node of the first transistor by a capacitor, and control circuit means for causing, in response to an initial timing signal, the voltage of the gate node of the first transistor of the first stage to transition from near the source voltage toward the drain voltage to turn the first transistor on and after a predetermined time delay causing the voltage of the gate node of the second transistor of the first stage to transition from a voltage near the drain voltage to a voltage near the source voltage to turn the second transistor of the first stage off thus causing the voltage on the gate node of the first transistor of the first stage to exceed the drain voltage supply as a result of the capacitive coupling between the source and gate nodes of the first transistor of the first stage, and control circuit means interconnecting each succeeding stage to each preceding stage for causing, in response to a timing signal from the preceding stage, the voltage of the gate node of the first transistor of the respective succeeding stage to transition from near the source voltage toward the drain voltage to turn the first transistor on and after a predetermined time delay causing the voltage of the gate node of the second transistor of the respective succeeding stage to transition from a voltage near the drain voltage to a voltage near the source voltage to turn the second transistor off thus causing the voltage on the gate node of the first transistor to exceed the drain voltage supply as a result of the capacitive coupling between the source and gate nodes of the first transistor whereby the source and gate nodes of the first transistors of the successive stages will sequentially transition from a voltage near the source voltage toward the drain voltage at predetermined intervals of time.

9. The circuit of claim 8 further characterized by precharge circuit means for charging the gate nodes of the first transistors of the stages to the source supply voltage and the gate nodes of the second transistors of the stages to the drain supply voltage and then isolating the gate nodes of the first transistors of the stages from the source supply voltage and isolatng the gate nodes of the second transistor from the drain supply voltage prior to the occurrence of the timing signal to the control circuit means for the first and during the occurrence of the succeeding sequential transitions of the nodes of the first transistors.

* * * * *

UNITED STATES PATENT OFFICE
CERTIFICATE OF CORRECTION

PATENT NO. : 3,898,479

DATED : August 5, 1975

INVENTOR(S) : Robert J. Proebsting

It is certified that error appears in the above-identified patent and that said Letters Patent are hereby corrected as shown below:

Column 1, line 15 "date" should be --data--

Column 4, line 44, "Referring" should start a new paragraph.

Column 4, line 58, "$q_{16}$" should be --$Q_{16}$--.

Column 4, line 63, "$q_{20}$" should be --$Q_{20}$--.

Column 5, line 28, "$q_{18}$" should be --$Q_{18}$--.

Column 6, line 11, "$q_{17}$" should be --$Q_{17}$--.

Column 6, line 17, "transistors" should be --transistor--.

Column 6, line 20, "$q_{20}$" should be --$Q_{20}$--.

Column 6, line 49, "$q_{26}$" should be --$Q_{26}$--.

Column 7, line 32, "transistor" should be --transistors--.

Column 7, line 37, after "logic 0" insert --to logic 1--.

Column 8, line 53, delete one "which".

Column 9, line 47, "cand" should be --c and--.

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*